United States Patent
Sherkin et al.

(10) Patent No.: US 8,996,855 B2
(45) Date of Patent: Mar. 31, 2015

(54) HTTP LAYER COUNTERMEASURES AGAINST BLOCKWISE CHOSEN BOUNDARY ATTACK

(71) Applicants: Research In Motion Limited, Waterloo (CA); Certicom Corp., Mississauga (CA)

(72) Inventors: Alexander Sherkin, Woodbridge (CA); Gregory Marc Zaverucha, Redmond, WA (US); Alexander Truskovsky, Waterloo (CA); Michael Matovsky, North York (CA); Osman Zohaib Arfeen, Ajax (CA)

(73) Assignees: BlackBerry Limited, Waterloo, Ontario (CA); Certicom Corp., Mississauga, Ontario (CA)

( * ) Notice: Subject to any disclaimer, the term of this patent is extended or adjusted under 35 U.S.C. 154(b) by 107 days.

(21) Appl. No.: 13/676,730

(22) Filed: Nov. 14, 2012

(65) Prior Publication Data
US 2014/0136834 A1   May 15, 2014

(51) Int. Cl.
*H04L 29/06* (2006.01)

(52) U.S. Cl.
CPC ........ *H04L 63/0428* (2013.01); *H04L 63/0823* (2013.01); *H04L 63/166* (2013.01)
USPC ............... 713/151; 713/150; 713/176; 726/3; 726/5; 726/13; 726/27

(58) Field of Classification Search
CPC .. H04L 63/0428; H04L 63/166; H04L 63/164
USPC ........................................ 713/151
See application file for complete search history.

(56) References Cited

U.S. PATENT DOCUMENTS

| | | | |
|---|---|---|---|
| 7,526,520 B2* | 4/2009 | Laux et al. | 709/203 |
| 8,701,160 B2* | 4/2014 | Liang | 726/3 |
| 2002/0095459 A1* | 7/2002 | Laux et al. | 709/203 |
| 2002/0161904 A1* | 10/2002 | Tredoux et al. | 709/229 |
| 2004/0224771 A1* | 11/2004 | Chen et al. | 463/42 |
| 2006/0155869 A1* | 7/2006 | Nanduri et al. | 709/232 |
| 2008/0034198 A1* | 2/2008 | He et al. | 713/151 |

(Continued)

OTHER PUBLICATIONS

EKR, "Security impact of the Rizzo/Duong CBC "BEAST" attack", Sep. 23, 2011.*

(Continued)

*Primary Examiner* — Yonas Bayou
(74) *Attorney, Agent, or Firm* — Integral Intellectual Property Inc.; Miriam Paton; Amy Scouten

(57) ABSTRACT

A client application, when executed by a processor, is operative to create a HyperText Transfer Protocol (HTTP) request containing a target header that includes a confidential value. The HTTP request is to be sent over a Secure Sockets Layer (SSL) 3.0 connection or a Transport Layer Security (TLS) 1.0 connection to a web server. The client application implements at its HTTP layer a countermeasure to a blockwise chosen-boundary attack. The client application generates an additional header having a header name that is not recognizable by the web server and inserts the additional header into the HTTP request ahead of the target header, thus creating a modified HTTP request. The modified HTTP request is to be sent, instead of the unmodified HTTP request, over the SSL 3.0 connection or the TLS 1.0 connection to the web server.

24 Claims, 14 Drawing Sheets

(56) References Cited

U.S. PATENT DOCUMENTS

| | | | |
|---|---|---|---|
| 2008/0270417 A1* | 10/2008 | Roker | 707/10 |
| 2009/0049557 A1* | 2/2009 | Friedman et al. | 726/27 |
| 2009/0227238 A1* | 9/2009 | Baard | 455/414.2 |
| 2009/0292925 A1* | 11/2009 | Meisel | 713/176 |
| 2009/0328187 A1* | 12/2009 | Meisel | 726/13 |
| 2012/0184258 A1* | 7/2012 | Kovvali et al. | 455/418 |

OTHER PUBLICATIONS

Thai Duong and Juliano Rizzo, "Here Come the XOR Ninjas", May 13, 2011.

Bodo Moeller et al, "Security of CBC Ciphersuites in SSL/TLS: Problems and Countermeasures", originally posted at http://www.openssl.org/~bodo/tls-cbc.txt, updated May 20, 2004.

* cited by examiner

```
GET<SP>/img1234.png<SP>HTTP/1.1<CR><LF>
Host:<SP>www.attack.com<CR><LF>
User-Agent:<SP>Mozilla/5.0 (Windows NT 6.1;
WOW64; rv:16.0) Gecko/20100101 Firefox/
16.0<CR><LF>
Cookie:<SP>sessionid=1cf1e8dac26e7afc9161baf3
0539fd<CR><LF>
<CR><LF>
```

FIG. 3

```
GET<SP>/img12345.png<SP>HTTP/1.1<CR><LF>
Host:<SP>www.attack.com<CR><LF>
XA:<SP>8f2bc0a4<CR><LF>                    ←910
User-Agent:<SP>Mozilla/5.0 (Windows NT 6.1;
WOW64; rv:16.0) Gecko/20100101 Firefox/
16.0<CR><LF>
Cookie:<SP>sessionid=1cf1e8dac26e7afc9161baf3
0539fd<CR><LF>
<CR><LF>
```

/img12345.png — 410
912 → Cookie line
914 → sessionid
916 → hex value
900

FIG. 9

```
GET<SP>/img1234.png<SP>HTTP/1.1<CR><LF>
              └─310
Host:<SP>www.attack.com<CR><LF>
X-MLC:<SP>81c8b7a2f<CR><LF>  ──── 1010
User-Agent:<SP>Mozilla/5.0 (Windows NT 6.1;
WOW64; rv:16.0) Gecko/20100101 Firefox/
16.0<CR><LF>
Cookie:<SP>sessionid=1cf1e8dac26e7afc9161baf3
0539fd<CR><LF>
<CR><LF>
```
↑1012   ↑1014   ↑1016
1000

HTTP LAYER COUNTERMEASURES AGAINST BLOCKWISE CHOSEN BOUNDARY ATTACK

BACKGROUND

HyperText Transfer Protocol (HTTP) is a stateless protocol. To provide continuity for communications between an HTTP client and an HTTP server (also known as a web server), the HTTP client will store a cookie containing information set by the web server, and will include that information in a cookie header in subsequent HTTP requests to the web server. For example, the cookie header may include a session identifier.

Transport Layer Security (TLS) is the industry standard for exchange of data over a secure channel, used with online banking, e-commerce and payment sites, and also used as the underlying security for virtual private networks (VPNs). Initially, a TLS channel is established, using public key infrastructure (PKI) certificates for authentication and to generate at each end of the channel a shared secret to be used for encrypting communications over the TLS channel. Symmetric cryptographic techniques use the shared secret, known as a session key, to exchange data in a secure manner over the TLS channel.

Secure Sockets Layer (SSL) 3.0 and TLS 1.0 suffer from a known vulnerability, namely susceptibility to a chosen-plaintext attack described by W. Dai and others as early as 2002. Until recently, it was generally believed that a chosen-plaintext attack could not feasibly be carried out to attack HTTPS communications.

In September 2011, Juliano Rizzo and That Duong presented at the Ekoparty conference in Argentina an attack on TLS 1.0/SSL 3.0 that enables them to decrypt HTTPS client requests on the fly and hijack sessions between an HTTPS client and a web server. The attack uses a tool called BEAST (Browser Exploit Against SSL/TLS) that enables them to grab and decrypt HTTPS cookies from active user sessions, such as supposedly confidential sessions with sensitive sites such as online banking, e-commerce and payment sites (e.g. PayPal™). The tool uses what is known as a blockwise chosen-boundary attack against the Advanced Encryption Standard (AES) encryption algorithm that is used in TLS/SSL.

SUMMARY

A client application, when executed by a processor, is operative to create a HyperText Transfer Protocol (HTTP) request containing a target header that includes a confidential value. The HTTP request is to be sent over a Secure Sockets Layer (SSL) 3.0 connection or a Transport Layer Security (TLS) 1.0 connection to a web server. The client application implements at its HTTP layer a countermeasure to a blockwise chosen-boundary attack on HTTP requests that are sent over a SSL 3.0 connection or a TLS 1.0 connection to a web server. The client application generates an additional header having a header name that is not recognizable by the web server and inserts the additional header into the HTTP request ahead of the target header, thus creating a modified HTTP request. The modified HTTP request is to be sent, instead of the unmodified HTTP request, over the SSL 3.0 connection or the TLS 1.0 connection to the web server.

BRIEF DESCRIPTION OF THE DRAWINGS

In the figures of the accompanying drawings, like reference numerals indicate corresponding, analogous or similar elements. For simplicity and clarity of illustration, elements shown in the figures have not necessarily been drawn to scale. For example, the dimensions of some of the elements may be exaggerated relative to other elements for clarity.

FIGS. 3 and 4 are illustrations of simplified example HTTP/1.1 request messages;

FIGS. 7-1, 7-2 and 7-3 are flowchart illustrations of alternatives for generating an additional header for inclusion in an HTTP request message;

FIGS. 8-12 are illustration of simplified modified example HTTP/1.1 request messages;

DETAILED DESCRIPTION

Figure 1:
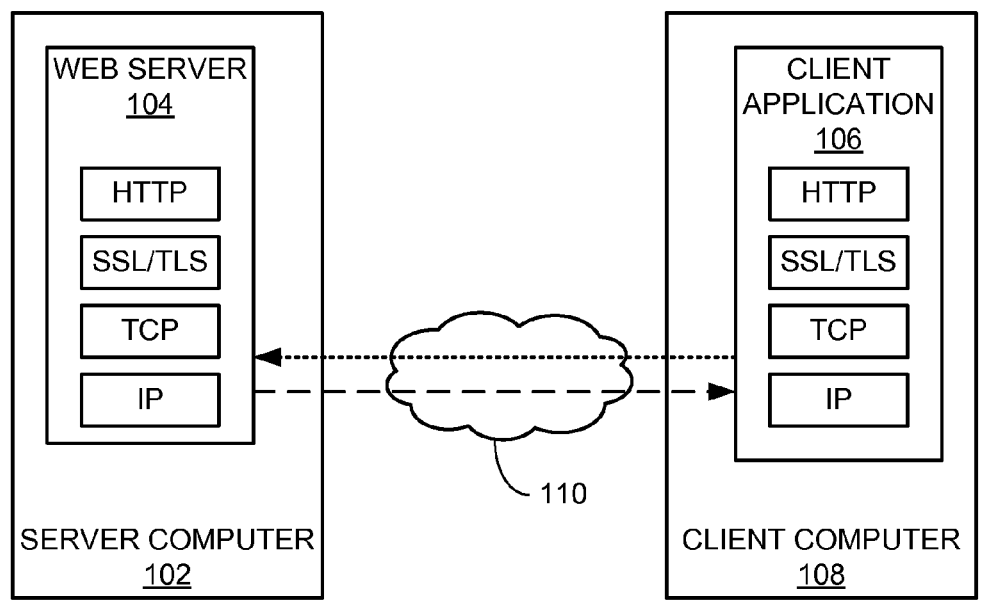
FIG. 1 is an illustration of an example client-server computer system for HTTPS communications.

FIG. 1 is an illustration of an example client-server computer system for HTTPS communications. A server computer 102 is able to respond to HTTP requests by providing HTTP responses. In FIG. 1, the HTTP requests are illustrated as dotted arrows, and the HTTP responses are illustrated as dashed arrows. Each [HTTP request, HTTP response] pair may be carried over a network, for example, an intranet or the Internet.

The server computer 102 has installed thereon an HTTP server, also known as a web server 104. The web server 104 includes an HTTP-layer component, an SSL/TLS-layer component, a Transmission Control Protocol (TCP)-layer component, and an Internet Protocol (IP)-layer component. Additional components of the web server 104 are not illustrated so as not to obscure the description. The SSL/TLS-layer component of the web server 104 is compatible with SSL 3.0 or with TLS 1.0 and may be compatible or incompatible with later versions of TLS such as TLS 1.1 and TLS 1.2. Thus it is appropriate to say that the web server 104 is compatible with SSL 3.0 or with TLS 1.0.

A client application 106 installed on a client computer 108 communicates with the web server 104 over a network 110. The client application 106 creates HTTP requests to be sent to the web server 104. The client application 106 includes an HTTP-layer component, an SSL/TLS-layer component, a TCP-layer component and an IP-layer component. Additional components of the client application 106 are not illustrated so as not to obscure the description. The SSL/TLS-layer component of the client application 106 is compatible with SSL 3.0 or with TLS 1.0. Thus it is appropriate to say that the client application 106 is compatible with SSL 3.0 or with TLS 1.0. The SSL/TLS-layer component of the client application 106 may be compatible or incompatible with later versions of TLS such as TLS 1.1 or TLS 1.2 or both or with future versions of TLS. If one or both of the web server 104 and the client application 106 is incompatible with later versions of TLS such as TLS 1.1 and TLS 1.2, all SSL/TLS connections between the client application 106 and the web server 104 are established and used according to either SSL 3.0 or TLS 1.0.

A non-exhaustive list of examples for the client computer 108 includes a personal computer, a tablet computer, a slate computer, a laptop computer, a notebook computer, a smartphone, a gaming device, and any other computing device capable of communications over a network.

A non-exhaustive list of examples for the client application 106 includes a web browser, a browser plug-in, an independent sandbox, a web application, a web services application using simple object access protocol (SOAP) over HTTP, a web services application using eXtensible Markup Language (XML) or JavaScript Object Notation (JSON) over HTTP, and any other software application capable of creating HTTP requests for transmission over an SSL/TLS connection to a web server in order to access, consume or display web content.

HTTP requests over an SSL/TLS connection from the client application 106 to the web server 104 are possibly susceptible to the Rizzo/Duong BEAST attack (assuming that other conditions for the attack are satisfied).

Figure 2:
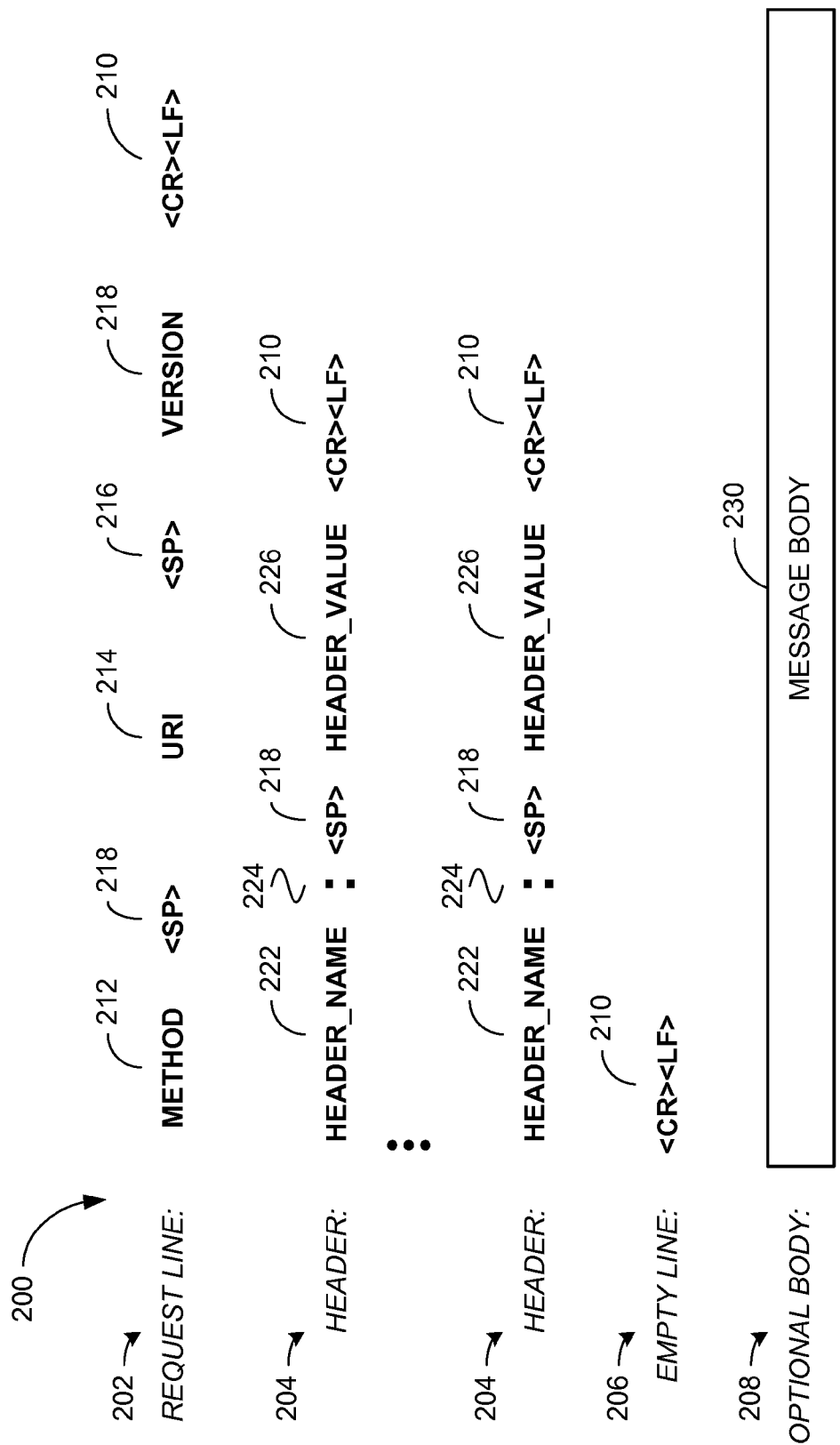
FIG. 2 is an illustration of the structure of an HTTP/1.1 request message.

FIG. 2 is an illustration of the structure of an HTTP/1.1 request message, generally referenced 200. An HTTP request message compliant with HTTP version 1.1 (denoted "HTTP/1.1", defined in Request For Comments (RFC) 2616, June 1999) includes a request line 202, one or more header lines 204, a mandatory empty line 206, and an optional message body 208. The lines are separated by a sequence 210 of a carriage return character <CR> and a line feed character <LF>.

The request line 202 consists of a method token 212 followed by a Uniform Resource Identifier (URI) 214 followed by an HTTP version identifier 216. These elements in the request line 202 are separated by single whitespace character <SP> 218. In HTTP/1.1, the method token 212 is a custom method token or one of the following eight strings: "HEAD", "GET", "POST", "PUT", "DELETE", "TRACE", "OPTIONS" and "CONNECT". The URI 216 identifies the resource upon which to apply the request.

Each header line 204 consists of a header name 222 followed by a colon character ":" 224, and a header value 226. The whitespace character <SP> 218 separates the colon character 224 and the header value 226. A Host header is mandatory in HTTP/1.1, where the URI is relative to the server identified in the Host header. Future versions of HTTP that permit an absolute URI (that is, a URI that includes an identification of the server) will not require a host header.

The empty line 206 consists solely of the <CR><LF> sequence 210. The optional message body 208 consists of whatever characters make up the message body 230.

Figure 4:
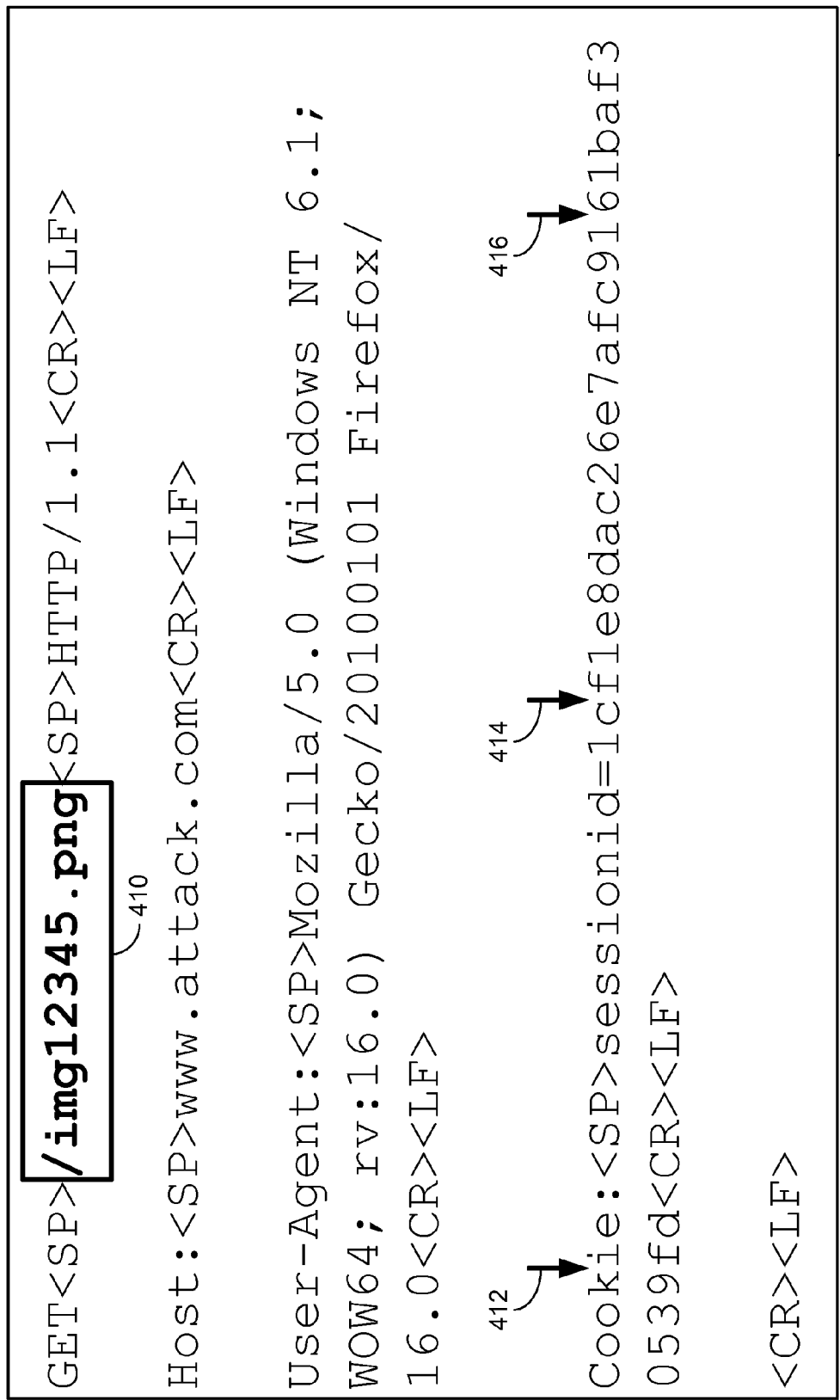
Figures 1, 7:
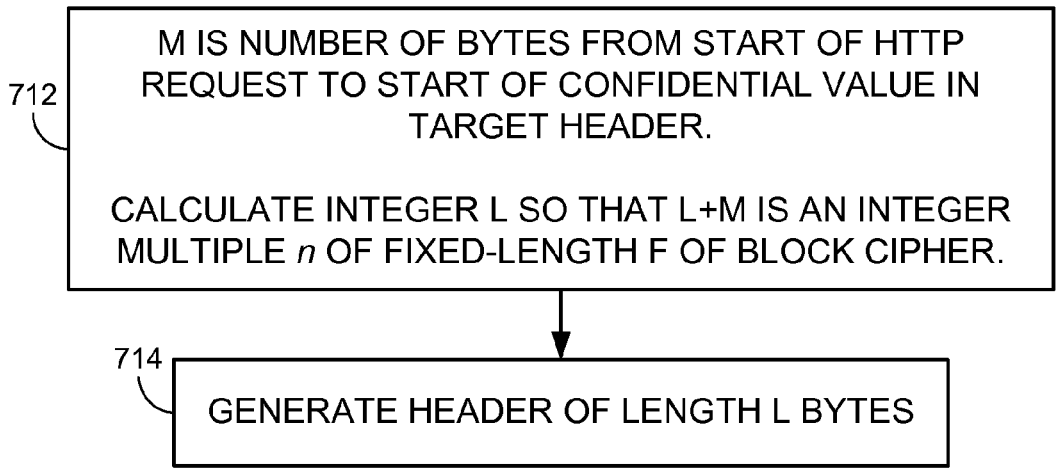
Figures 2, 7:
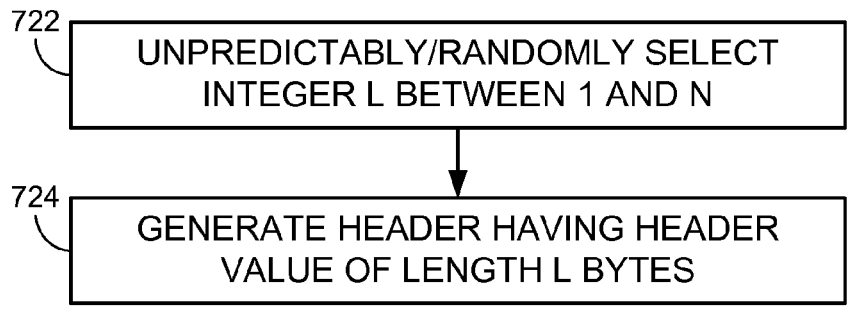
Figures 3, 7:
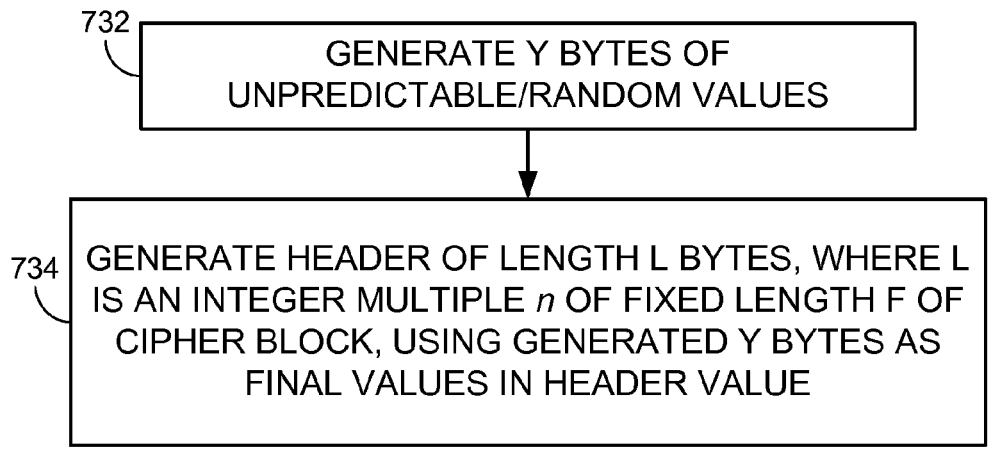

FIG. 3 is an illustration of a simplified example HTTP/1.1 request message 300, and FIG. 4 is an illustration of a simplified example HTTP/1.1 request message 400. Generally, the content of an HTTP request (other than the message body) is predictable. That is, for a specific HTTP client operative on a specific client computer, the following elements of an HTTP request are predictable: the method token, the HTTP version, most of the headers. The existence and format of a cookie header in the HTTP request is also predictable, although some of the actual content of the cookie header value is unpredictable.

In the example HTTP request message 300, the URI 310 is "/img1234.png", whereas in the example HTTP request message 400, the URI 410 is "/img12345.png", one byte longer than the URI 410. All other elements of the example HTTP request messages 300 and 400 are identical. In particular, the cookie headers of the example HTTP request messages 300 and 400 are identical, both containing the header value "sessionid=1cf1e8dac26e7afc9161baf30539fd".

Figure 5:
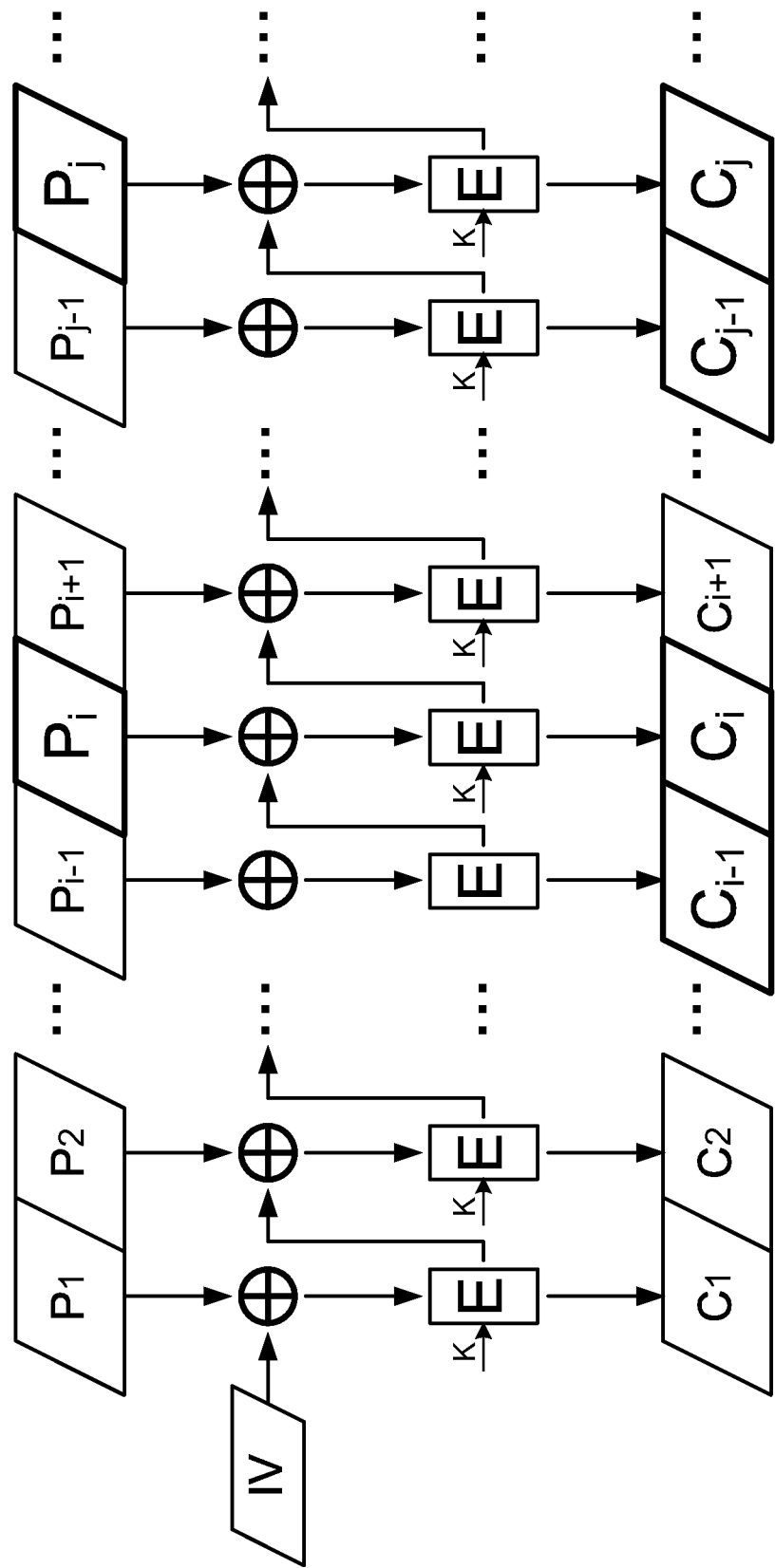
FIG. 5 is an illustration of cipher block chaining (CBC) encryption mode use in several cipher suites in a TLS/SSL layer.

The SSL/TLS-layer components of the client application 106 employ a cipher-block chaining (CBC) mode encryption, as illustrated in FIG. 5.

An encryption module E, provided with a symmetric key K, carries out block cipher encryption on its fixed-length input, known as a block, producing a ciphertext output of the same fixed length. For example, module E may implement a version of the Advanced Encryption Standard (AES) encryption algorithm, which has a fixed block size of 128 bits. In another example, module E may implement a version of the Data Encryption Standard (DES) encryption algorithm or a version of the Triple-DES encryption algorithm.

CBC mode encryption involves the exclusive bitwise OR (XOR) operation. Each plaintext block is XOR'ed with the last ciphertext block and then encrypted to produce the next ciphertext block. The first plaintext block $P_1$ in the chain is XOR'ed with an initialization vector IV. If the first block has index n=1, the mathematical formula for CBC encryption is: $C_n = E_K(P_n \oplus C_{n-1})$ for n>0, where $C_0$=IV and where $E_K$ represents block cipher encryption using symmetric key K. Thus every block of ciphertext depends, in theory, on every bit of plaintext that was previously used.

In TLS 1.0, CBC mode encryption is applied to records consisting of plaintext blocks, and the initialization vector IV for each record (other than the first record) is the previous record's final ciphertext block, a technique known as chained IVs. As described in "Here Come The ⊕ Ninjas" by That Duong and Juliano Rizzo, "Thus the initialization vector IV for each record is predictable, and an attacker intercepting network traffic can know the IV for the next record to be encrypted before the next record is actually encrypted. This means that if an attacker can control the first block of the input into SSL's underlying CBC encryption scheme, he will be able to control the corresponding input to the underlying block cipher."

In February 2002, W. Dai described a theoretical chosen-plaintext attack on SSL/TLS. To determine plaintext block $P_i$, ciphertext blocks $C_{i-1}$ and $C_i$ are observed by an attacker and, at a later time in the same chain (so the same symmetric key K is being used for encryption), the attacker injects a chosen plaintext block $P_j$. Plaintext block $P_j$ is chosen to be equal to $g \oplus C_{j-1} \oplus C_{i-1}$, where g is a guess of the value of plaintext block $P_i$, $C_{i-1}$ is the observed ciphertext block that was XOR'ed with plaintext block $P_i$ and then encrypted to produce ciphertext block $C_i$, which was also observed, and $C_{j-1}$ is the observed ciphertext block that will be XOR'ed with chosen plaintext block $P_j$. The ciphertext block $C_i$ can be formulated mathematically as $E_K(P_i \oplus C_{i-1})$. The ciphertext block $C_j$ can be formulated mathematically as $E_K(P_j \oplus C_{j-1}) = E_K(g \oplus C_{j-1} \oplus C_{i-1} \oplus C_{j-1}) = E_K(g \oplus C_{i-1})$. If the guess g is correct (that is, g is identical to $P_i$), then ciphertext block $C_j$ is equal to $E_K(P_i \oplus C_{i-1})$, which is equal to the ciphertext block $C_i$. Thus the attacker can confirm the guess by checking whether the observed ciphertext block $C_i$ is identical to the observed ciphertext block $C_j$.

In the case of 128-bit (16-byte) blocks, a chosen-plaintext attack involving whole blocks requires $2^{128}$ guesses, or on average, half as many (that is, $2^{127}$) guesses, which is not practical for a real-time attack on-the-fly. The Rizzo/Duong BEAST attack described in "Here Come The ⊕ Ninjas" is a variant on the theoretical chosen-plaintext attack, and controls or manipulates block boundaries so that only a single byte is attacked at a time. It is termed a blockwise chosen-boundary attack (BCBA).

Consider the situation where the TLS records (and hence the plaintext blocks) are formed from an HTTP request that includes a session identifier in the cookie header. Each HTTP request is partitioned into plaintext blocks of a fixed length (e.g. 16 bytes=128 bits) prior to CBC mode encryption. By controlling the length of the URI in the HTTP request, the attacker is able to control where the block boundaries are located within the HTTP request. For example, an increase of one byte in the length of the URI moves all subsequent boundaries of plaintext blocks by one byte. This is apparent from the example HTTP requests illustrated in FIG. 3 and FIG. 4, where, for clarity, only some of the block boundaries are illustrated. An increase of one byte in the length of the URI (from URI 310 to URI 410) results in block boundaries indicated by arrows 412, 414 and 416 that are advanced by one byte relative to block boundaries indicated by arrows 312, 314 and 316. (In the examples illustrated in FIG. 3 and FIG. 4, the size of each plaintext block and of each ciphertext block is 16 bytes=128 bits. Other CBC mode encryption schemes may involve a different block size.)

In the example illustrated in FIG. 3, the 16-byte plaintext block between the arrow 312 and the arrow 314 consists of the text "kie:<SP>sessionid=1". All bytes of the 16-byte plaintext block between the arrow 312 and the arrow 314 are known except the final byte. Only 256 guesses (or on average 128 guesses) would be required to carry out a chosen plaintext attack to identify that "1" is the first byte of the session identifier.

In the example illustrated in FIG. 4, the 16-byte plaintext block between the arrow 412 and the arrow 414 consists of the text. "ie:<SP>sessionid=1c". Assuming that the first byte "1" of the session identifier has been successfully guessed, all bytes of the 16-byte plaintext block between the arrow 312 and the arrow 314 are known except the final byte. Only 256 guesses (or on average 128 guesses) would be required to carry out a chosen plaintext attack to identify that "c" is the second byte of the session identifier.

Rizzo and Duong have demonstrated an attack in which a complete session identifier contained in a cookie header of an HTTP request message sent to the web server at paypal.com was successfully guessed in under 2 minutes, thus allowing the attacker to take over an ongoing session with that web server.

More generally, one can consider the attack to be an attack to discover a confidential value in a target header. The target header may be a cookie header that includes a confidential session identifier. Even the name of the session identifier cookie may be a confidential value, as is the case with web servers at PayPal™. Alternatively the target header may be a header that includes sensitive user information such as a credit card number, a social insurance number or social security number, and the like.

Proposed Countermeasures

Countermeasures to this attack have previously been implemented at the TLS layer, for example, by several browser vendors. However, in some cases, servers cannot handle the changes to the TLS traffic resulting from the TLS-layer countermeasures, and force the HTTP clients to communicate using standard TLS 1.0. Furthermore, in some cases, HTTP clients use third-party TLS libraries (e.g. OpenSSL™, Java Secure Socket Extension (JSSE), Security Builder® SSL™ from Certicom Corp., etc.) and cannot easily or are not permitted to change the TLS layer. Unlike the previous countermeasures, this document proposes countermeasures against this attack that are implemented solely at the HTTP layer (either before or after serialization of the HTTP request). Thus the proposed countermeasures are particularly suitable for applications that are either unable or not permitted to change the TLS layer, and are particularly suitable for communications with web servers that cannot handle changes to the TLS traffic that are not compatible with TLS 1.0.

Figure 6:
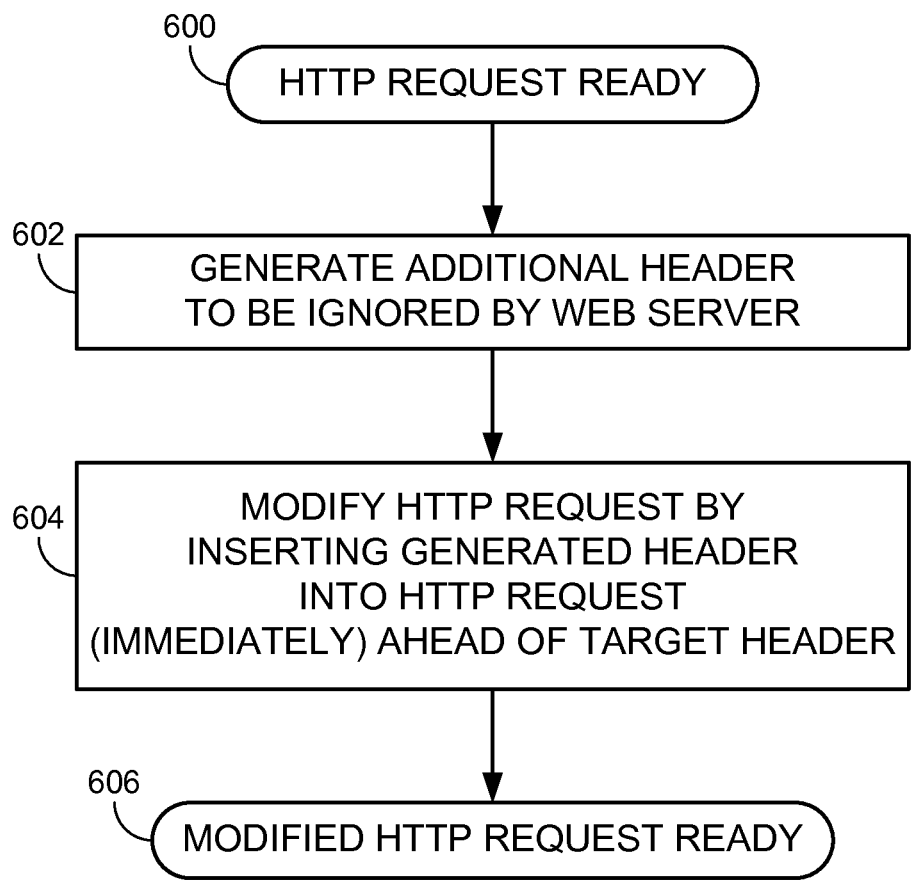
FIG. 6 is a flowchart illustration of a general countermeasure method implementable in an HTTP-layer component of a client application.

FIG. 6 is a flowchart illustration of a general countermeasure method implementable in an HTTP-layer component of a client application. At 600, an HTTP request message is ready for handling by lower layers and ultimately for transmission over an SSL/TLS connection to a web server. The HTTP request message is "ready" in that the HTTP request message contains all the content (request line, any header lines, mandatory empty line, optional body) that the application customarily would include in the HTTP request message so that the HTTP request message is properly handled by the web server. The HTTP request message contains a target header that includes a confidential value. At 602, the application generates an additional header to be ignored by the web server. The content of the additional header is meaningless and may contain random or arbitrary values. Three proposed alternatives for generating the additional header are described below with respect to FIGS. 7-1, 7-2 and 7-3.

At 604, the application inserts the generated additional header into the HTTP request message, thus creating a modified HTTP request message. At 606, the modified HTTP request message is ready for serialization (if not already serialized) and subsequently for handling by lower layers and ultimately for transmission over an SSL/TLS connection to a web server.

The additional header has the compliant format header_name:<SP>header_value<CR><LF>, where the header_name is not recognized by the web server and therefore the entire additional header is ignored by the web server when processing the received modified HTTP request message that includes the additional header.

The application inserts the generated additional header into the HTTP request message ahead of the target header. For the proposed alternatives described with respect to FIG. 7-1 and FIG. 7-2, it is sufficient that the additional header be inserted into the HTTP request message ahead of the target header, and it is not necessary that the additional header be inserted immediately ahead of the target header. In other words, in those alternatives, it is acceptable for one or more intervening headers to be positioned between the inserted additional header and the target header in the modified HTTP request message. However, for the proposed alternative described with respect to FIG. 7-3, the additional header is likely to be inserted immediately ahead of the target header, although, under certain circumstances, it is possible to have one or more intervening headers between the additional header and the target header. Such circumstances will depend on the size of the fixed-length of the block cipher used in the CBC mode of encryption, the size of the intervening header(s), and the distance from the start of the target header to the confidential value.

Countermeasure: Boundary Position Forced to Start of Confidential Value

Referring now to FIG. 7-1, generating the additional header at the HTTP-layer component of the application may be performed as follows. At 712, the HTTP-layer component of the application calculates an integer L, and at 714, the HTTP-layer component of the application generates a header of length L bytes. As mentioned above, the header name is one that will not be recognized by the web server, and therefore the entire additional header is ignored by the web server when processing the received modified HTTP request message. The length L of the generated header is such that in the modified HTTP request message, the confidential value is at the start of a plaintext block. This counteracts the boundary-setting aspect of the attack, thus preventing the attacker from including the start of the confidential value in a plaintext block the rest of which is known plaintext.

Suppose the length (in bytes) from the start of the HTTP request message to the start of the confidential value is M. By inserting an additional header of length L bytes ahead of the target header, the length (in bytes) from the start of the modified HTTP request message to the start of the confidential value is L+M. We want the sum L+M to be an integer multiple of the fixed-length of the block cipher used in the CBC mode of encryption, because (assuming a boundary of the plaintext blocks is at the start of the HTTP request message) then the start of the confidential value will be at the start of a plaintext block. In other words, inserting the additional header of length L bytes ahead of the target header forces the block boundaries to align with the start (that is, the first byte) of the confidential value in the target header. Mathematically, this is formulated as (L+M)=F·n, where integer n≥1 and F is the fixed length (in bytes) of the block cipher used in the CBC mode of encryption. That is, F is the fixed length (in bytes) of each plaintext block that is XOR'ed with the previous ciphertext block and then encrypted, and F is the fixed length (in bytes) of each ciphertext block that is produced by the encryption. Thus the length L (in bytes) may be calculated as follows: L=F·n−M, where M is the length (in bytes) from the start of the HTTP request message to the start of the confidential value.

In practice, this method may be implemented, for example, by using a fixed header name, followed by a colon, a whitespace, and a variable number of bytes of arbitrary values, so that the total length of the header equals the calculated value L.

Alternatively, this method may be implemented, for example, by using a header name selected from a group of fixed header names (not necessarily all of the same length), and varying the length of the header value (consisting of arbitrary values), so that the total length of the header equals the calculated value L.

The header value consists of arbitrary values, which means that it is not significant which values are chosen for the header value. The header value may include random values, pseudo-random values, fixed values, or any other value.

Figure 8:
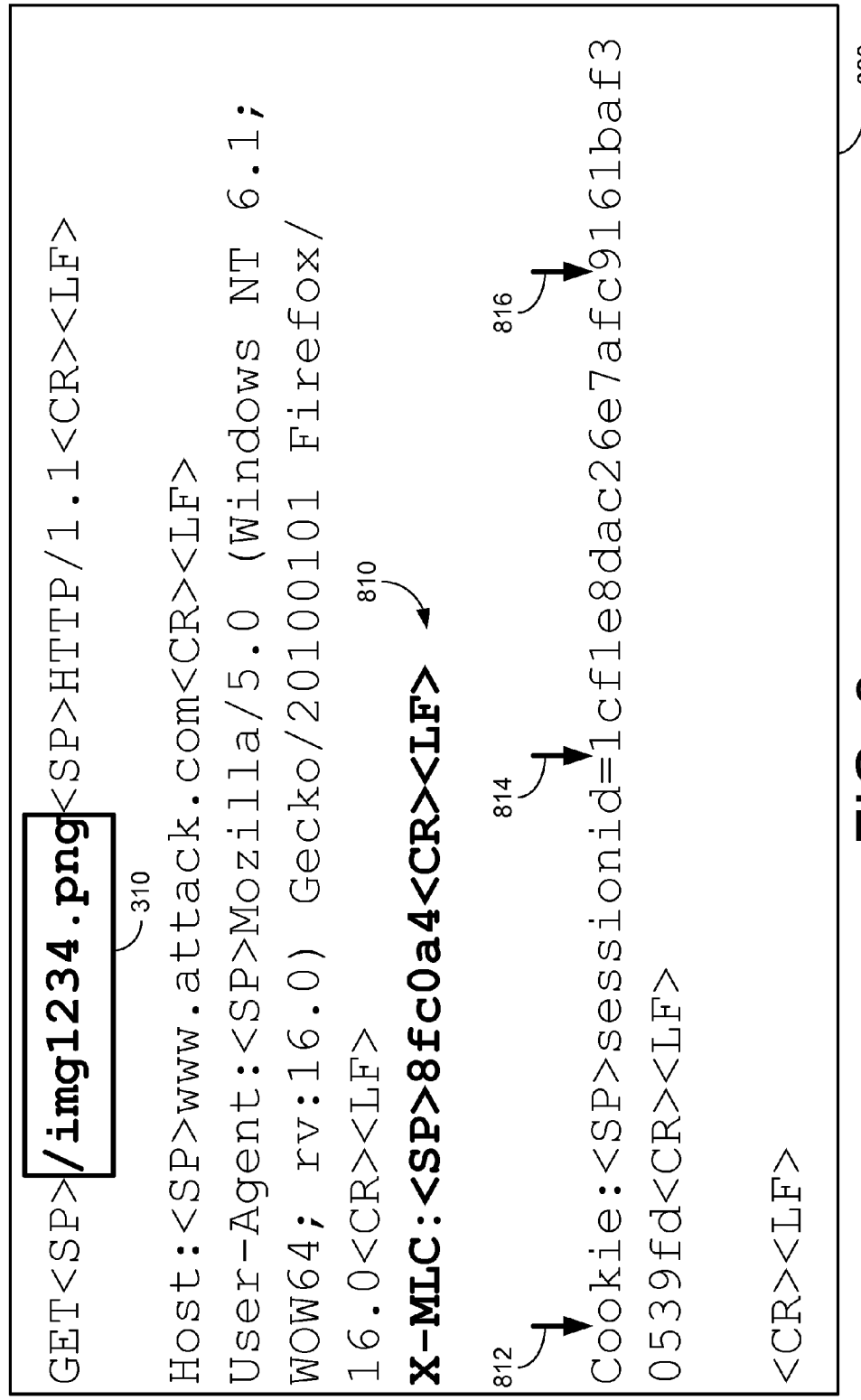

An example HTTP/1.1 request message 800 is illustrated in FIG. 8 where, for clarity, only some of the block boundaries are illustrated, as indicated by arrows 812, 814 and 816. The example HTTP request message 800 differs from the example HTTP request message 300 in that the 15-byte header "X-MLC:<SP>8fc0a4<CR><LF>" 810 has been inserted ahead of the cookie header, thus forcing the block boundary indicated by arrow 814 to be positioned at the beginning of the confidential value in the cookie header, that is, at the beginning of the value of the session identifier "1cf1e8dac26e7afc9161baf30539fd". The same result would be achieved by inserting a header of length 15+16n bytes, where integer n≥1.

An example HTTP/1.1 request message 900 is illustrated in FIG. 9 where, for clarity, only some of the block boundaries are illustrated, as indicated by arrows 912, 914 and 916. The example HTTP request message 900 differs from the example HTTP request message 400 in that the 14-byte header "XA: <SP>8f2bc0a4<CR><LF>" 910 has been inserted ahead of the cookie header, thus forcing the block boundary indicated by arrow 914 to be positioned at the beginning of the confidential value in the cookie header, that is, at the beginning of the value of the session identifier "1cf1e8dac26e7afc9161baf30539fd". The same result would be achieved by inserting a header of length 14+16n bytes, where integer n≥1.

Note also that in FIG. 8, the additional header 810 is inserted immediately ahead of the target header, whereas in FIG. 9, the additional header 910 is inserted between the Host header and the User-Agent header, both of which are ahead of the cookie header.

Thus attempts by an attacker to control the positioning of block boundaries by controlling the length of the URI in an HTTP request message are countered by this countermeasure, because the inserted header has a length calculated precisely to ensure that a block boundary is positioned at the beginning of the confidential data in the target header. The attacker will thus be prevented from carrying out a chosen-boundary attack in which all bytes of a plaintext block are known except for a single unknown byte of the confidential value.

In a modification of this proposed countermeasure, the boundary position is forced not to be aligned at the first byte of the confidential value, but to be aligned at the second byte of the confidential value. With this modification, the attacker may be able to guess the first byte of the confidential value, but not any further bytes of the confidential value. The mathematical formulation provided above, (L+M)=F·n, applies to this modification, where now M is the length (in bytes) from the start of the HTTP request message to the start of the second byte of the confidential data.

Countermeasure: Boundary Position Unpredictable Due to Variable/Random-Length Header Inserted Ahead of Target Header Referring now to FIG. 7-2, generating the additional header at the HTTP-layer component of the application may be performed as follows. At 722, the HTTP-layer component of the application selects an integer L from the set $\{1, 2, \ldots, N\}$ in a random or unpredictable manner, and at 724, the HTTP-layer component of the application generates a header having a header value of length L bytes. (The entire length of the generated header is H+L+4, where H is the length (in bytes) of the header name, because the colon, whitespace and <CR><LF> sequence contribute another 4 bytes to the header.) This is equivalent to the HTTP-layer component of the application selecting an integer Q from the set $\{H+5, H+6, \ldots, H+4+N\}$ in a random or unpredictable manner, and then generating a header having a total length of Q, where H is the length (in bytes) of the header name. As mentioned above, the header name is one that will not be recognized by the web server, and therefore the entire additional header is ignored by the web server when processing the received modified HTTP request message. The attacker is expecting the URI in the HTTP request line to cause the block boundaries to be placed in precise locations. Insertion of the generated additional header having a header value of "random" length L means that the attacker's expectation has only a 1/N chance of being correct. Thus the attack becomes more difficult, because an attacker does not know which block to attack. The attacker thus has to guess which block to attack. It therefore requires more guesses to decrypt one byte, and that makes the attack more expensive in terms of required resources and less practical. The size N of the set of header value lengths may be chosen to be the same as the fixed length (in bytes) F of the cipher block, for example, 16. Other choices for the size N are also contemplated. A larger size N will provide more variability in the length of the generated additional header, thus making the attack more difficult. However, a larger size N will also increase the size of some of the modified HTTP request messages. These two conflicting effects may be considered when choosing the size N to use when implementing the countermeasure.

In practice, this method may be implemented, for example, by using a fixed header name, followed by a colon, a whitespace, L bytes of arbitrary values, and the sequence <CR><LF>. The header value consists of arbitrary values, which means that it is not significant which values are chosen for the header value. The header value may include random values, pseudo-random values, fixed values, or any other value.

An example HTTP/1.1 request message 1000 is illustrated in FIG. 10 where, for clarity, only some of the block boundaries are illustrated, as indicated by arrows 1012, 1014 and 1016. The example HTTP request message 1000 differs from the example HTTP request message 300 in that the header "X-MLC:<SP>81c8b7a2f<CR><LF>" 1010 has been inserted ahead of the cookie header. Thus instead of the attacker controlling the block boundaries so that the plaintext block between arrows 312 and 314 equals "kie:<SP>sessionid=1", the block boundaries are moved so that the plaintext block between arrows 1012 and 1014 equals ":<SP>sessionid=1cf1". This disrupts the attack, because the attacker is unsure of the location of the block boundaries.

Figure 11:
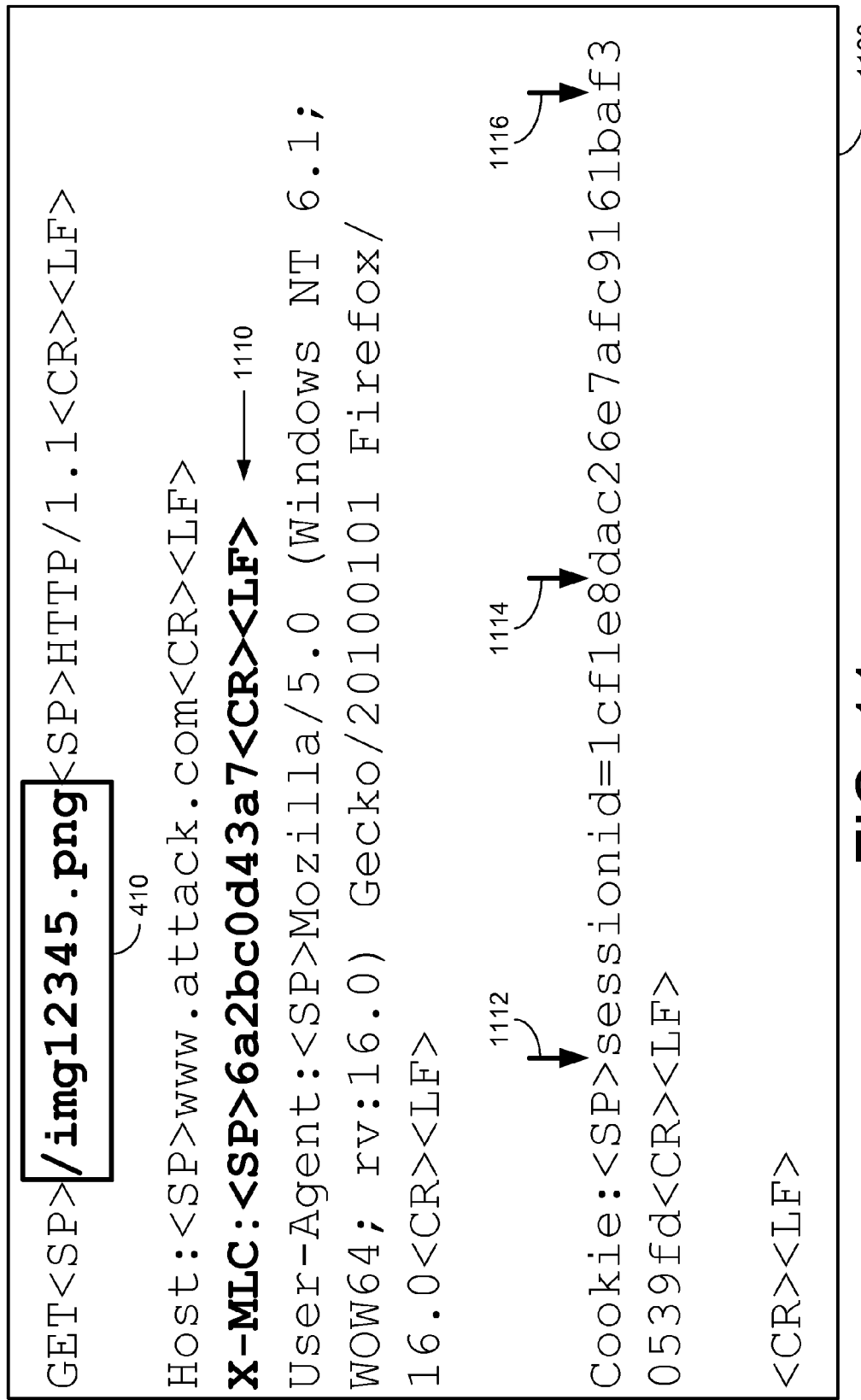

An example HTTP/1.1 request message 1100 is illustrated in FIG. 11 where, for clarity, only some of the block boundaries are illustrated, as indicated by arrows 1112, 1114 and 1116. The example HTTP request message 1100 differs from the example HTTP request message 400 in that the 20-byte header "X-MLC:<SP>6a2bc0d43a7<CR><LF>" 1110 has been inserted ahead of the cookie header. Thus instead of the attacker controlling the block boundaries so that the plaintext block between arrows 412 and 414 equals "ie:<SP>sessionid=1c", the block boundaries are moved so that the plaintext block between arrows 1112 and 1114 equals "sessionid=1cf1e8". This disrupts the attack, because the attacker is unsure of the location of the block boundaries.

Although the additional headers 1010 and 1110 are inserted between the Host header and the User-Agent header, both of which are ahead of the cookie header, in an alternative implementation one or both of these additional headers could have been inserted immediately ahead of the target header in their respective HTTP request messages.

Thus attempts by an attacker to control the positioning of block boundaries by controlling the length of the URI in an HTTP request message are complicated by this countermeasure, because the inserted header has an unpredictable variable length. The attacker will need more guesses to carry out an attack, which may make the attack less feasible.

Countermeasure—Random Header Values Inserted Ahead of Target Header, so that Block Containing Start of Target Header Value Always Includes Random Values Referring now to FIG. 7-3, generating the additional header at the HTTP-layer component of the application may be performed as follows. At 732, the HTTP-layer component of the application generates Y bytes of unpredictable or random values, and at 734, the HTTP-layer component of the application generates a header having a total length of L bytes, where L is a multiple n of the fixed length F (in bytes) of the block cipher. The final Y bytes of the header value of the generated header are the Y bytes of unpredictable or random values generated at 732. As mentioned above, the header name is one that will not be recognized by the web server, and therefore the entire additional header is ignored by the web server when processing the received modified HTTP request message.

The attacker is expecting the URI in the HTTP request line to cause the block boundaries to be placed in precise locations. Insertion of the generated additional header of total length L (in bytes) that is a multiple n of the fixed length F (in bytes) of the block cipher ensures that the block boundaries in the modified HTTP request are in those same precise locations.

The attacker may control the URI so that a block boundary is placed after the first byte of the target header value. The attacker intends to conduct a block-wise chosen-boundary attack, where all (F−1) bytes of the HTTP request that precede the target header value are known and only the first byte of the target header value is unknown. However, due to insertion of the generated additional header, Y of the (F−1) bytes that precede the target header value are unpredictable or random values. Thus the space from which the attacker needs to guess a plaintext has expanded from 1 byte to (Y+1) bytes. In other words, the attacker needs to make $2^{8(1+Y)}$ guesses (or on average, $2^{7+8Y}$ guesses) to identify the unknown first byte of the target header. For large enough Y, the attack is no longer feasible.

In the case where the generated additional header is inserted immediately ahead of the target header, the (F−1) bytes that precede the target header value include the Y unpredictable or random values, the <CR> and <LF> bytes, the target header name, the colon byte and the <SP> byte. If the fixed length F (in bytes) of the block cipher is particularly large, it may be possible to insert the generated additional header ahead of the target header, but not immediately ahead of the target header, such that the Y unpredictable or random values are included in the same plaintext block as the first byte of the target header value, even though there are one or more intervening headers between the inserted additional header and the target header.

Figure 12:
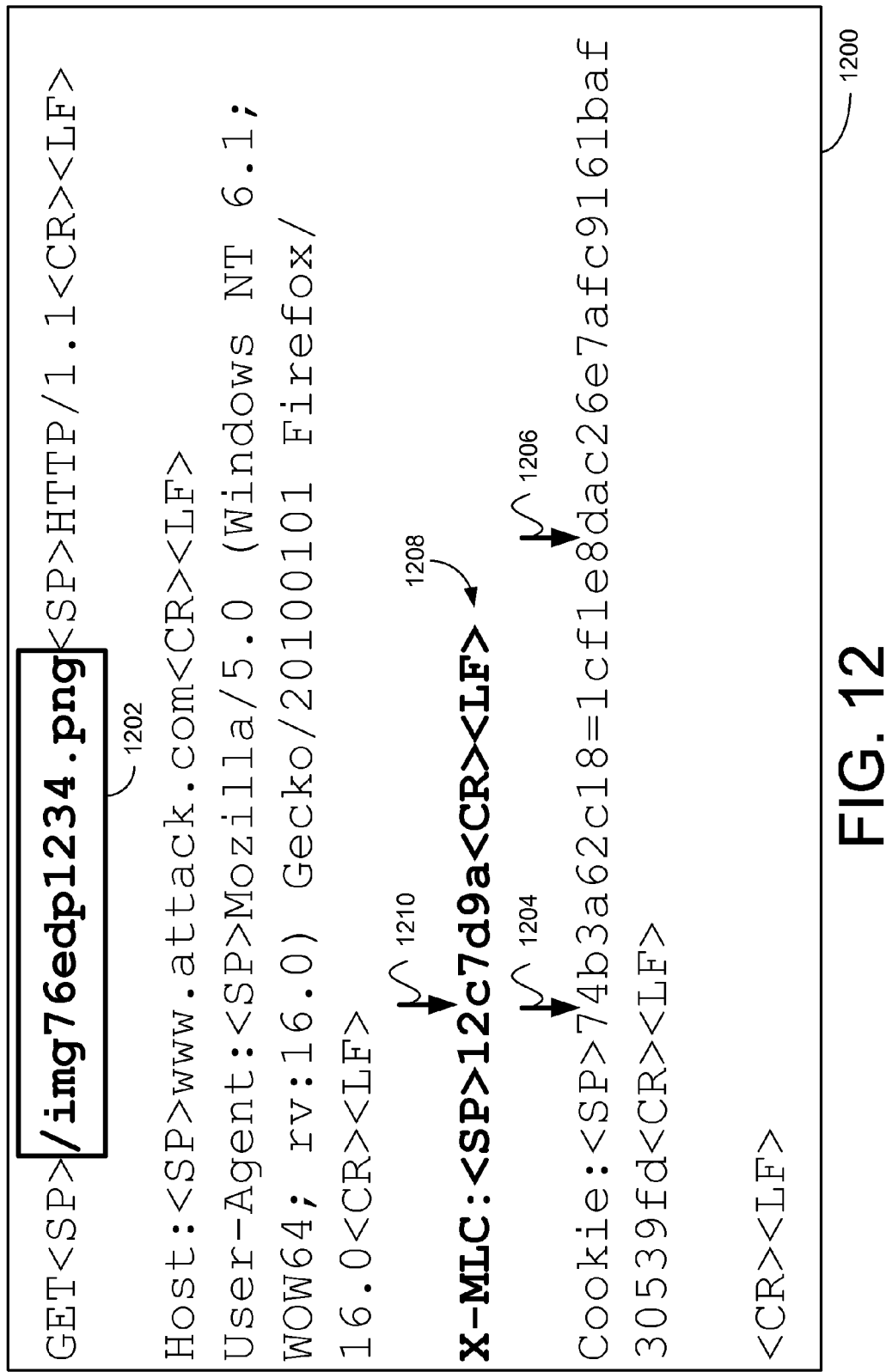

An example HTTP/1.1 request message 1200 is illustrated in FIG. 12 where, for clarity, only some of the block boundaries are illustrated. The URI "/img76edp1234.png" 1202 causes the block boundaries to be placed in precise locations, for example, as indicated by arrows 1204 and 1206. The block boundary indicated by the arrow 1204 is immediately after the first byte of the cookie header value. In this example HTTP request message, the name of the cookie in the header value is itself a confidential value. If a header 1208 had not been inserted in the HTTP request message, the plaintext block ending at the first byte of the cookie header value would have been equal to "/16.0<CR><LF>Cookie:<SP>7", so that all bytes of that plaintext block would have been known except for the first byte of the cookie header. Insertion of the header 1208 immediately ahead of the cookie header results in a plaintext block between an arrow 1210 and the arrow 1204 that equals "c7d9a<CR><LF>Cookie:<SP>7", which includes 5 bytes of unpredictable or random values, namely "c7d9a" in addition to the first (unknown) byte of the cookie header. Thus, although the attacker has succeeded in controlling the block boundaries through control of the URI, the insertion of 5 bytes of unpredictable or random values immediately ahead of the target header disrupts the attack by adding uncertainty to the plaintext.

This countermeasure will not work if the target header has a long, predictable prefix before the confidential value. That is, if the <CR> and <LF> bytes, together with the target header name (e.g. "Cookie"), the colon byte, the <SP> byte, and the prefix, have a length (in bytes) that equals or exceeds the fixed length F (in bytes) of the block cipher, then any unpredictable or random values in a header inserted in the HTTP request immediately ahead of the target header will not be in the same plaintext block as any bytes of the confidential value. For example, if the cookie header started with "Cookie:<SP>sessionID=", then any unpredictable or random values in a header inserted in the HTTP request immediately ahead of the cookie header will not be in the same plaintext block as any bytes of the confidential value of the session identifier.

Figure 13:
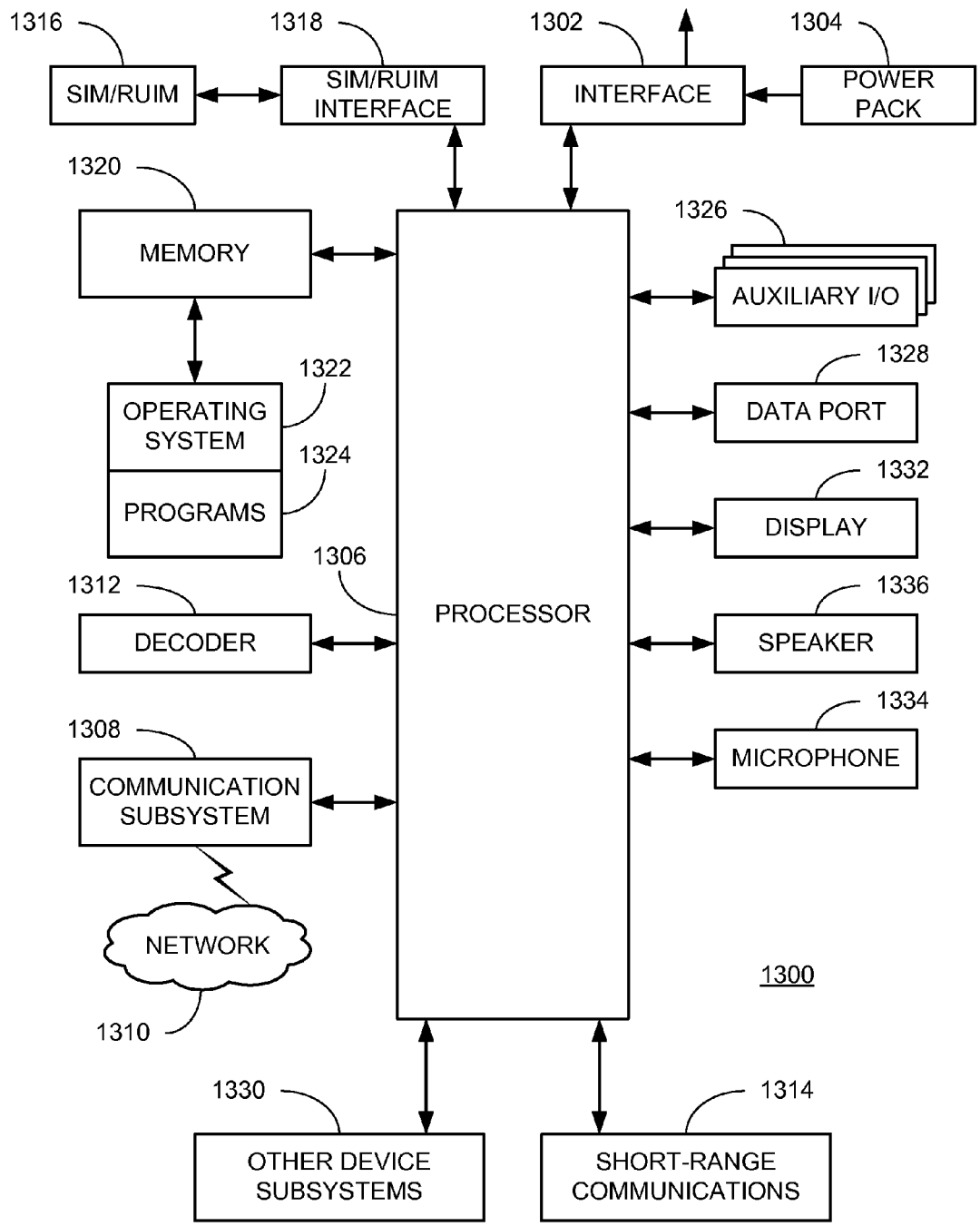
FIG. 13 is a simplified block diagram of an example client computer capable of HTTPS communications.

FIG. 13 is a simplified block diagram of an example client computer 1300 capable of HTTPS communications, for example, the client computer 108.

The various components are operably connected to one another. That is, the components are physically, mechanically and/or electronically connected such that they can function in cooperation or concert with one another. Functioning in cooperation or concert may include controlling or being controlled by another component or transmitting electrical signals to or receiving signals from another component. The lines in FIG. 13 with arrows depict some illustrative operative connections, but the concepts described herein are not limited to this configuration of connections.

The client computer 1300 includes an interface 1302 for receiving a power pack 1304, which supplies power to the electronic components of the client computer 1300. The power pack 1304 may be one or more rechargeable batteries or another type of power source, such as a fuel cell, or any combination of power sources. Although the client computer 1300 may also receive power wirelessly or by a conductor from an external source, the power pack 1304 may supply power in ordinary usage, thereby making the client computer 1300 more readily portable.

The client computer 1300 includes a processor 1306, which controls the overall operation of the client computer 1300. The processor 1306 may be configured to perform (that is, may be capable of performing) any number of operations or functions. Although depicted in FIG. 13 as a single component, the processor 1306 may be embodied as a set of processors or sub-processors or other specialized data processing components (such as a clock that can measure time intervals between events). A communication subsystem 1308 controls data and voice communication functions, such as email, PIN (Personal Identification Number) message functions, SMS (Short Message Service) message functions and cellular telephone functions, for example. The communication subsystem 1308 may receive messages from and send messages to a wireless network 1310, which may be a data-centric wireless network, a voice-centric wireless network or a dual-mode wireless network. Data received by the client computer 1300 is decompressed and decrypted by a decoder 1312.

In FIG. 13, the communication subsystem 1308 is a dual-mode wireless network that supports both voice and data communications. The communication subsystem 1308 may be configured in accordance with the Global System for Mobile Communication (GSM) and General Packet Radio Services (GPRS) standards. The communication subsystem 1308 may alternatively be configured in accordance with Enhanced Data GSM Environment (EDGE) or Universal Mobile Telecommunications Service (UMTS) standards. Other wireless networks may also be associated with the client computer 1300, including Code Division Multiple Access (CDMA) or CDMA2000 networks. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The wireless network 1310 may include base stations (not shown) that provide a wireless link to the client computer 1300. Each base station defines a coverage area, or cell, within which communications between the base station and the client computer 1300 can be effected. The client computer 1300 is movable within the cell and may be moved to coverage areas defined by other cells. The client computer 1300 may further include a short-range communications subsystem 1314, which enables the client computer 1300 to communicate directly with other devices and computer systems without the use of the wireless network 1310 through infrared or Bluetooth™ technology, for example.

To identify a subscriber for network access, the client computer 1300 uses a Subscriber Identity Module or a Removable User Identity Module (SIM/RUIM) card 1316 for communication with a network, such as the wireless network 1310. The SIM/RUIM card 1316 may be physically or electronically coupled or both to the other components via an interface 1318. Alternatively, user identification information may be programmed into memory 1320. The SIM/RUIM card 1316 is used to identify the user of the portable electronic device, store personal device settings and enable access to network services, such as email and voice mail, for example, and is not bound to a particular client computer 1300.

The processor 1306 is connected to memory 1320, which may include Random Access Memory (RAM) and or any other kind of volatile or non-volatile memory. Although depicted as a single component, memory 1320 may comprise several distinct memory elements. Memory 1320 typically stores software executed by the processor 106, such as an operating system 1322 and software programs 1324. Such software may be stored in a persistent, updatable store. Applications or programs may be loaded onto the client computer 1300 through the wireless network 1310, the auxiliary input/output (I/O) subsystems 1326, the data port 1328, the short-range communications subsystem 1314, or any other device subsystem 1330. Some examples of software applications that may be stored on and executed by the client computer 1300 include: electronic messaging, games, calendar, address book and music player applications. Software applications that control basic device operation, such as voice and data communication, are typically installed during manufacture of the client computer 1300. Other software that may be stored in memory 1320 includes a client application, for example, client application 106, that is compatible with SSL 3.0 or with TLS 1.0 and that is operative to create an HTTP request containing a target header that includes a confidential value, to generate an additional header having a header name that is not recognizable by a web server, and to insert the additional header into the HTTP request ahead of the target header, thus creating a modified HTTP request to be sent, instead of the unmodified HTTP request, over an SSL 3.0 connection or a TLS 1.0 connection to the web server.

The auxiliary I/O subsystems 1326 includes any of several input and output systems. The auxiliary I/O subsystems 1326 may include, for example, a camera, which receives visual input (which may include still or moving images or both). The auxiliary I/O subsystems 1326 may also include a light or a lamp to illuminate the scene or produce a flash when the camera is receiving visual input for recording. The auxiliary I/O subsystems 1326 may be under the control of or supply input to the processor 1306.

Some other input-output devices are shown explicitly in FIG. 13. These input-output devices may be under the control of or supply input to the processor 1306. A display 1332 may present visual information to a user. The display 1332 may be of any type. In some devices, the display 1332 may be a touch screen that can display visual output and receive touch input. A microphone 1334 may pick up audible information, that is, the microphone 1334 may receive or capture audible information in the form of sound waves and convert the audible information to analog or digital signals or a combination thereof. The microphone 1334 may be of any type, and may receive audible input in a number of situations, such as speech during voice communication, or sounds during audio recording, or sounds during audio recording with video recording. A speaker 1336 may present audible information to a user, either as sounds alone or in concert with visual information. In general, a user may, via the input-output devices, record, control, store, process and play back audio recordings (which may include video recordings). The user may also engage in any number of other activities, such as writing and sending email or text messages, initiating or receiving telephone communications, viewing web pages, playing games, and so on.

The client computer 1300 components are generally housed in a housing (not shown), which typically gives some structural integrity or overall shape to the client computer 1300 and which may be part of the device frequently touched by a user. The housing that may expose the display 1332, and include one or more ports for the speaker 1336 and the microphone 1334. The housing may also include access to one or more input/output devices, such as buttons or other switches.

Figure 14:
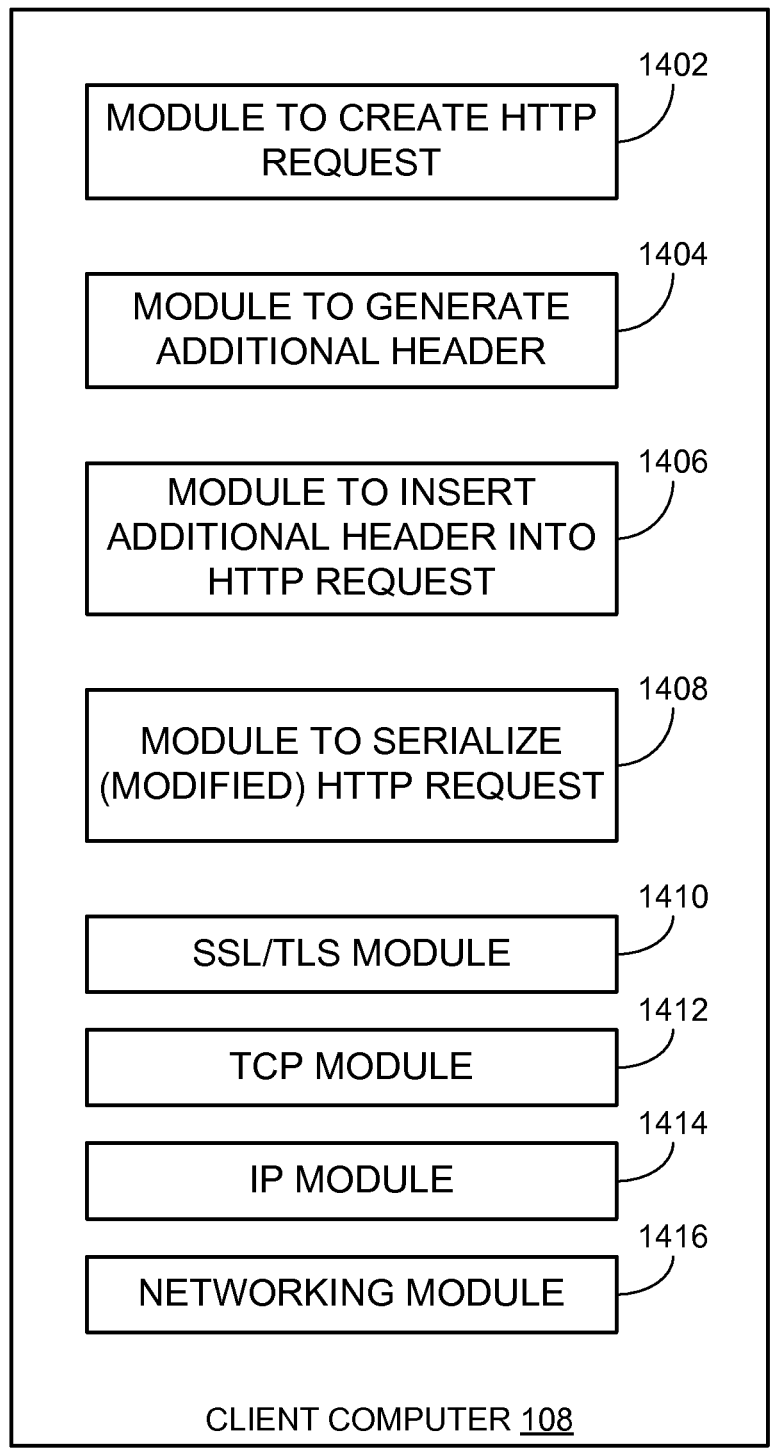
FIG. 14 is a simplified functional block diagram of an example client computer capable of HTTPS communications.

FIG. 14 is a simplified functional block diagram of an example client computer capable of HTTPS communication, for example, the client computer 108. In keeping with the method described with respect to FIG. 6, the client computer 108 comprises a module 1402 effecting means for creating an HTTP request, the HTTP request containing a target header that includes a confidential value. The HTTP request is to be sent to a web server over an SSL 3.0 connection or a TLS 1.0 connection. The client computer 108 comprises a module 1404 effecting means for generating an additional header that is not recognizable by the web server. For example, the module 1404 may effect means for implementing the method described with respect to FIG. 7-1, or the method described with respect to FIG. 7-2, or the method described with respect to FIG. 7-3. The client computer 108 comprises a module 1406 effecting means for inserting the additional header into the HTTP request ahead of the target header, thus creating a modified HTTP request. The client computer 108 comprises a module 1408 effecting means for serializing the unmodified HTTP request or for serializing the modified HTTP request. The client computer 108 comprises an SSL/TLS module 1410 effecting means for establishing an SSL 3.0 connection or a TLS 1.0 connection with a server. The client computer 108 comprises a TCP module 1412 effecting means for TCP communications, and an IP module 1414 effecting means for IP communications. SSL/TLS module 1410, TCP module 1412 and IP module 1414 are similar or equivalent to the SSL/TLS layer, TCP layer and IP layer of the client application 106. The client computer 108 comprises a network module 1416 effecting means for communications by the client computer 108 over a network.

What is claimed is:

1. A method of modifying a HyperText Transfer Protocol (HTTP) request to be sent over a Secure Sockets Layer (SSL) 3.0 connection or a Transport Layer Security (TLS) 1.0 connection to a web server, the HTTP request containing a target header that includes a confidential value, the method comprising:
   generating an additional header having a header name that is not recognizable by the web server; and
   inserting the additional header into the HTTP request ahead of the target header, thus creating a modified HTTP request to be sent, instead of the unmodified HTTP request, over the SSL 3.0 connection or the TLS 1.0 connection to the web server, wherein the modified HTTP request is of longer length than the unmodified HTTP request.

2. The method as recited in claim 1, wherein generating the additional header comprises calculating the length of the additional header such that a length, in bytes, of the modified HTTP request up to and not including a first byte of the confidential value is an integer multiple of a fixed byte-length of a block cipher used in cipher-block chaining (CBC) mode encryption for the SSL 3.0 connection or for the TLS 1.0 connection.

3. The method as recited in claim 1, wherein generating the additional header comprises calculating the length of the additional header such that a length, in bytes, of the modified HTTP request up to and not including a second byte of the confidential value is an integer multiple of a fixed byte-length of a block cipher used in cipher-block chaining (CBC) mode encryption for the SSL 3.0 connection or for the TLS 1.0 connection.

4. The method as recited in claim 1, wherein generating the additional header comprises selecting the length of the additional header from a predefined set in a random or unpredictable manner.

5. The method as recited in claim 1, wherein the additional header is inserted into the HTTP request immediately ahead of the target header.

6. The method as recited in claim 1, wherein generating the additional header comprises:
   generating unpredictable or random values; and
   using the generated unpredictable or random values as the final values in a header value of the additional header.

7. The method as recited in claim 1, further comprising serializing the modified HTTP request.

8. The method as recited in claim 1, wherein the HTTP request is serialized prior to having the additional header inserted therein.

9. A client computer comprising:
   a processor;
   a network interface coupled to the processor, through which the client computer is operative to communicate with a server computer having installed thereon a web server that is compatible with Secure Sockets Layer (SSL) 3.0 or with Transport Layer Security (TLS) 1.0; and
   a memory coupled to the processor, the memory storing a client application that is compatible with SSL 3.0 or with TLS 1.0, the client application operative, when executed by the processor, to create an HTTP request containing a target header that includes a confidential value, to generate an additional header having a header name that is not recognizable by the web server, and to insert the additional header into the HTTP request ahead of the target header, thus creating a modified HTTP request to be sent, instead of the unmodified HTTP request, over an SSL 3.0 connection or a TLS 1.0 connection to the web server, wherein the modified HTTP request is of longer length than the unmodified HTTP request.

10. The client computer as recited in claim 9, wherein the client application, when executed by the processor, is operative to calculate the length of the additional header such that a length, in bytes, of the modified HTTP request up to and not including a first byte of the confidential value is an integer multiple of a fixed byte-length of a block cipher used in cipher-block chaining (CBC) mode encryption for the SSL 3.0 connection or for the TLS 1.0 connection.

11. The client computer as recited in claim 9, wherein the client application, when executed by the processor, is operative to calculate the length of the additional header such that a length, in bytes, of the modified HTTP request up to and not including a second byte of the confidential value is an integer multiple of a fixed byte-length of a block cipher used in cipher-block chaining (CBC) mode encryption for the SSL 3.0 connection or for the TLS 1.0 connection.

12. The client computer as recited in claim 9, wherein the client application, when executed by the processor, is operative to select the length of the additional header from a predefined set in a random or unpredictable manner.

13. The client computer as recited in claim 9, wherein the client application, when executed by the processor, is operative to insert the additional header into the HTTP request immediately ahead of the target header.

14. The client computer as recited in claim 9, wherein the client application, when executed by the processor, is operative to generate unpredictable or random values and to use the generated unpredictable or random values as the final values in a header value of the additional header.

15. The client computer as recited in claim 9, wherein the client application, when executed by the processor, is operative to serialize the modified HTTP request.

16. The client computer as recited in claim 9, wherein the client application, when executed by the processor, is operative to serialize the unmodified HTTP request prior to inserting the additional header therein.

17. A memory having stored thereon computer-executable instructions for a HyperText Transfer Protocol (HTTP) client application, wherein the instructions, when executed by a processor of a client computer, result in:
    creating an HTTP request containing a target header that includes a confidential value, the HTTP request to be sent over a Secure Sockets Layer (SSL) 3.0 connection or a Transport Layer Security (TLS) 1.0 connection to a web server;
    generating an additional header having a header name that is not recognizable by the web server; and
    inserting the additional header into the HTTP request ahead of the target header, thus creating a modified HTTP request to be sent instead of the unmodified HTTP request over the SSL 3.0 connection or the TLS 1.0 connection to the web server, wherein the modified HTTP request is of longer length than the unmodified HTTP request.

18. The memory as recited in claim 17, wherein generating the additional header comprises calculating the length of the additional header such that a length, in bytes, of the modified HTTP request up to and not including a first byte of the confidential value is an integer multiple of a fixed byte-length of a block cipher used in cipher-block chaining (CBC) mode encryption for the SSL 3.0 connection or for the TLS 1.0 connection.

19. The memory as recited in claim 17, wherein generating the additional header comprises calculating the length of the additional header such that a length, in bytes, of the modified HTTP request up to and not including a second byte of the confidential value is an integer multiple of a fixed byte-length of a block cipher used in cipher-block chaining (CBC) mode encryption for the SSL 3.0 connection or for the TLS 1.0 connection.

20. The memory as recited in claim 17, wherein generating the additional header comprises selecting the length of the additional header from a predefined set in a random or unpredictable manner.

21. The memory as recited in claim 17, wherein the additional header is inserted into the HTTP request immediately ahead of the target header.

22. The memory as recited in claim 17, wherein generating the additional header comprises:
    generating unpredictable or random values; and
    using the generated unpredictable or random values as the final values in a header value of the additional header.

23. The memory as recited in claim 17, wherein the instructions, when executed by the processor, further result in serializing the modified HTTP request.

24. The memory as recited in claim 17, wherein the instructions, when executed by the processor, further result in serializing the unmodified HTTP request prior to having the additional header inserted therein.

* * * * *